United States Patent [19]

Yamada et al.

[11] Patent Number: 4,969,033
[45] Date of Patent: Nov. 6, 1990

[54] CIRCUIT FOR REMOVING CROSSTALK COMPONENTS IN A CARRIER CHROMINANCE SIGNAL

[75] Inventors: Hiroshi Yamada; Ryo Nakano, both of Yokohama; Yasutoshi Matsuo, Kawasaki; Seiichi Mikami, Yokohama, all of Japan

[73] Assignee: Victor Company of Japan, Ltd., Yokohama, Japan

[21] Appl. No.: 505,182

[22] Filed: Apr. 5, 1990

Related U.S. Application Data

[62] Division of Ser. No. 285,263, Dec. 16, 1988, Pat. No. 4,930,005.

[30] Foreign Application Priority Data

Dec. 18, 1987 [JP] Japan ................................ 62-120576
May 19, 1988 [JP] Japan ................................ 63-320872

[51] Int. Cl.$^5$ ............................................. H04N 5/21
[52] U.S. Cl. ............................... 358/36; 358/40; 358/167; 358/328; 358/329
[58] Field of Search ............... 358/36, 37, 40, 26, 358/27, 166, 167, 328, 329, 340

[56] References Cited

U.S. PATENT DOCUMENTS 3,872,498 3/1975 Pritchard ............................. 358/329
4,839,727 6/1989 tanaka ................................. 358/36

FOREIGN PATENT DOCUMENTS 0218241 4/1987 European Pat. Off. .

OTHER PUBLICATIONS

IEEE Transactions On Consumer Electronics, Vol. CE-31, No. 3, Aug. 1985, pp. 240-253, IEEE, New York, U.S.; T. Okada, et al.
"Flicket-Free Non-Interlaced Receiving System", for Standard Color TV Signals:
Wireless World, vol. 89, Dec, 1975, pp. 74-79, Olchester, GB; D. Read: "Improving Colour Television Decoding".

*Primary Examiner*—Tommy P. Chin
*Attorney, Agent, or Firm*—Pollock, VandeSande & Priddy

[57] ABSTRACT

In a circuit for removing crosstalk components in a carrier chrominance signal, there are provided a first delay circuit (20), an inverter (21), a first higher-voltage detecting circuit (18), a second delay circuit (22), a second higher-voltage detecting circuit (19), a third higher-voltage detecting circuit (25), a first lower-voltage detecting circuit (23), a second lower-voltage detecting circuit (24), a third lower-voltage detecting circuit (17), and an adder (26) thereby producing a crosstalk-removed carrier chrominance signal. Furthermore, the first delay circuit (20), the inverter (21), and an adder (28) form a comb filter for correcting a time delay due to said circuit for removing crosstalk components in a carrier chrominance signal.

3 Claims, 8 Drawing Sheets

CIRCUIT FOR REMOVING CROSSTALK COMPONENTS IN A CARRIER CHROMINANCE SIGNAL

This is a division of application Ser. No. 285,263, filed Dec. 16, 1988, now U.S. Pat. No. 4,930,005.

BACKGROUND OF THE INVENTION

1. Field of the Invention

This invention relates generally to a chrominance signal processing circuit for a color video signal reproducing apparatus such as a VTR, and particularly to a circuit for removing crosstalk components in a carrier chrominance signal.

2. Prior Art

In general VTRs used at the present time, a luminance signal and a chrominance signal are separated from a color video signal thereof, and the frequency of the chrominance signal is down-converted to obtain a frequency down-converted chrominance signal when the color video signal is recorded on a tape. When such recorded color video signal is reproduced, the opposite signal-processings are performed to obtain a reproducing color video signal. Meanwhile, in order to reduce crosstalk components of the reproducing down-converted chrominance signal on the tape, a phase-shift processing method which is disclosed in Japanese Patent Publication No. 56-9073 is used, for example. However, when there is no vertical-correlation between adjacent horizontal lines on a displayed image, color-blurring occurs.

SUMMARY OF THE INVENTION

The present invention has been developed in order to remove the above-described drawbacks inherent to the conventional chrominance signal processing circuit.

It is, therefore, an object of the present invention to provide a new and useful chrominance signal processing circuit in which color-blurring on a display can be removed.

It is another object of the invention to provide a chrominance signal processing circuit in which crosstalk components in a carrier chrominance signal can be effectively removed.

In accordance with the present invention there is provided a circuit for removing crosstalk components in a carrier chrominance signal, comprising: first delay circuit means responsive to the carrier chrominance signal; inverter means responsive to an output signal from the first delay circuit means; first higher-voltage detecting circuit means responsive to the carrier chrominance signal and an output signal from the inverter means for outputting a first higher-voltage signal therebetween; second delay circuit means responsive to the output signal from the first delay circuit means; second higher-voltage detecting circuit means responsive to the output signal from the inverter means and an output signal from the second delay circuit means for outputting a second higher-voltage signal therebetween; third higher-voltage detecting circuit means responsive to the first and second higher-voltage signals for outputting a third higher-voltage signal; first lower-voltage detecting circuit means responsive to the carrier chrominance signal and the output signal from the inverter means for outputting a first lower-voltage signal therebetween; second lower-voltage detecting circuit means responsive to the output signal from the inverter means and the output signal from the second delay circuit means for outputting a second lower-voltage signal therebetween; third lower-voltage detecting circuit means responsive to the first and second lower-voltage signals for outputting a third lower-voltage signal; and adder means responsive to the third higher-voltage signal and the third lower-voltage signal thereby producing a crosstalk-removed carrier chrominance signal.

In accordance with the present invention there is provided a circuit for removing crosstalk components in a carrier chrominance signal, comprising: first delay circuit means responsive to the carrier chrominance signal; first ¼ attenuation circuit means responsive to the carrier chrominance signal; inverter means responsive to an output signal from the first delay circuit means; second delay circuit means responsive to the output signal from the first delay circuit means; second ¼ attenuation circuit means responsive to an output signal from the second delay circuit means; ½ attenuation circuit means responsive to an output signal from the inverter means; adder means responsive to output signals from the first and second ¼ attenuation circuit means and an output signal from the ½ attenuation circuit means thereby producing a crosstalk-removed carrier chrominance signal.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Prior to describing the preferred embodiments of the present invention, the above-mentioned conventional chrominance signal processing circuit in the NTSC system will be described for a better understanding of the present invention.

Figure 7:
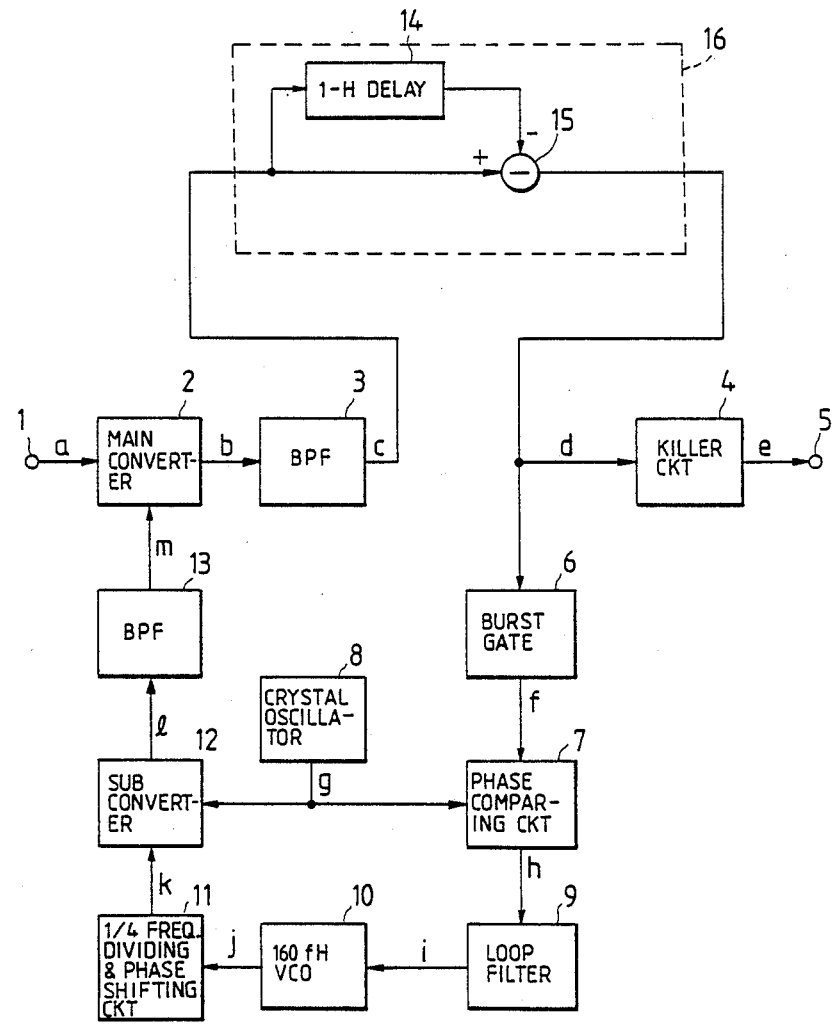
FIG. 7 is a block diagram of a conventional chrominance signal processing circuit.

Referring now to FIG. 7, the conventional chrominance signal processing circuit generally comprises a main converter 2, a first band-pass filter (BPF) 3, a two-line type chrominance signal comb filter 16, a killer circuit 4, a burst gate 6, a phase comparing circuit 7, a crystal oscillator 8, a loop filter 9, a 160 fH voltage controlled oscillator (VCO) 10, a ¼ frequency-dividing and phase-shifting circuit 11, a sub-converter 12, and a second BPF 13. The two-line type chrominance signal comb filter 16 includes a 1-H delay circuit 14 and a subtractor 15.

The operation of the conventional chrominance signal processing circuit having the above-mentioned structure will be described hereinbelow. A reproduced frequency down-converted chrominance signal (a) is fed, via an input terminal 1, to the main converter 2. In the main converter 2, the chrominance signal (a) is converted to a carrier chrominance signal (b) having a frequency of 3.58 MHz, and then, the carrier chrominance signal (b) is sent to the first BPF 3. In the first BPF 3, undesired band-width components are removed from the carrier chrominance signal (b). An outputted carrier chrominance signal (c) from the first BPF 3 is inputted into the chrominance signal comb filter 16 so as to remove crosstalk components therefrom. Such a crosstalk-removed signal (d) is outputted, via the killer circuit 4, from the output terminal 5 as a reproduced chrominance signal (e). The crosstalk-removed signal (d) is also fed to the burst gate 6 for producing a burst signal (f). The burst signal (f) outputted from the burst gate 6 is inputted into the phase comparing circuit 7.

Meanwhile, a reference signal (g) having a frequency of 3.58 MHz is produced by the crystal oscillator 8, and is sent to the phase comparing circuit 7. In the phase comparing circuit 7, a phase difference signal (h) is produced with the burst signal (f) being compared with the reference signal (g). The phase difference signal (h) is inputted into the loop filter 9 to cut undesired frequency components. An outputted signal (i) from the loop filter 9 is sent to the 160 fH VCO 10 to be operated as a control voltage thereof, and the 160 fH VCO 10 outputs a 160 fH signal (j). The 160 fH signal (j) is frequency-divided and phase-shifted by the ¼ frequency-dividing and phase-shifting circuit 11 to obtain a signal (k) of frequency 40 fH. This signal (k) and the reference signal (g) outputted from the crystal oscillator 8 are applied to the sub-converter 12 to produce a signal (l) having a frequency of 4.21 MHz. This signal (l) of 4.21 MHz is sent, via the second BPF 13, to the main converter 2 as a signal (m).

Although the block diagram of FIG. 7 is of the NTSC system, when the above-mentioned conventional circuit is applied to the PAL system, the following changes are required. The 160 fH VCO 10 is changed into a 321 fH VCO, and the ¼ frequency-dividing circuit 11 is changed into a ⅛ frequency-dividing circuit. Besides, the 1-H delay circuit 14 is changed into a 2-H delay circuit. Here, in the main converter, the chrominance signal is converted into a signal having a frequency of 4.43 MHz, and the crystal oscillator produces a signal having a frequency of 4.43 MHz thereby obtaining a 5.06 MHz signal from the second BPF.

Figure 8A:
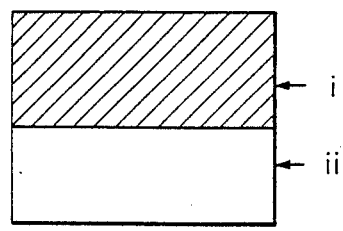
FIG. 8A is one example of source images.
Figure 8B:
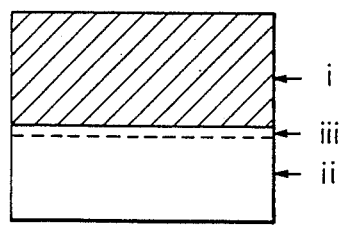
FIG. 8B is a reproduced image obtained by supplying the source image of FIG. 8A to the conventional chrominance signal processing circuit.

In the above-mentioned conventional chrominance signal processing circuit, however, assuming that a source image is formed of an upper red portion (i) and a lower colorless portion (ii) as shown in FIG. 8A, a reproduced image has a color-blurring portion (iii) in one line just below the upper red portion (i) as shown in FIG. 8B because there is no vertical-correlation between the upper red portion (i) and the lower colorless portion (ii).

Figure 1:
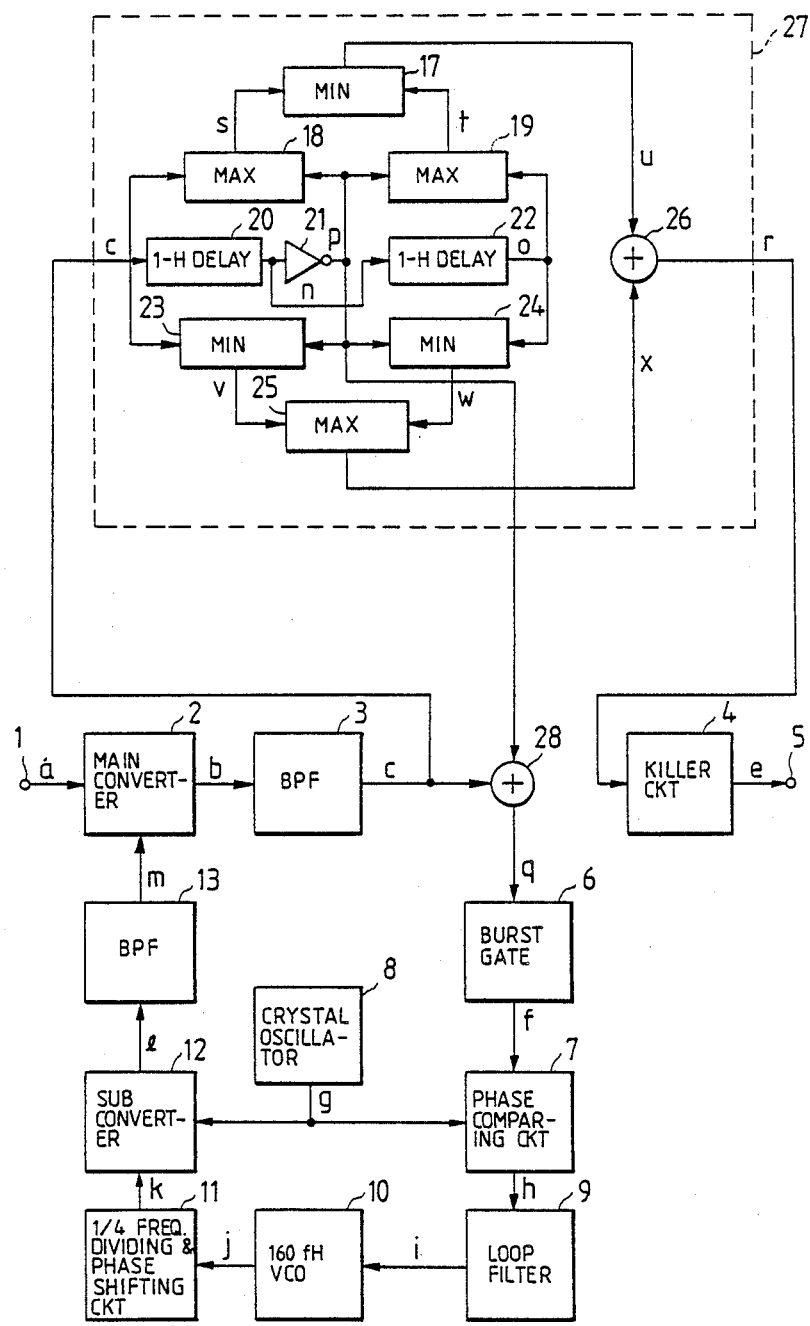
FIG. 1 is a block diagram of a chrominance signal processing circuit having a circuit for removing crosstalk components in a carrier chrominance signal according to a first embodiment of the present invention.

FIG. 1 shows a block diagram of a chrominance signal processing circuit having a circuit for removing crosstalk components in the NTSC system according to a first embodiment of the present invention. The chrominance signal processing circuit of FIG. 1 is substantially the same as that of FIG. 7 except for a chrominance signal comb filter 27, and an adder 28. In this diagram, those parts which are the same as those of FIG. 7 are designated by the same numerals and description thereof is omitted.

Figure 3A:
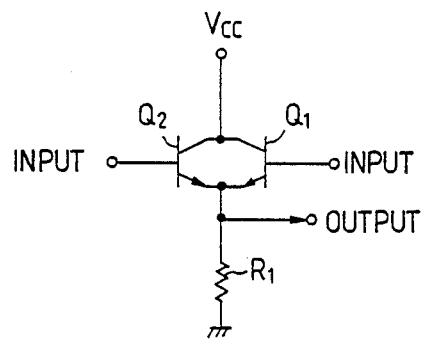
FIG. 3A is a higher-voltage detecting circuit used in the circuit for removing crosstalk components in a carrier chrominance signal.
Figure 3B:
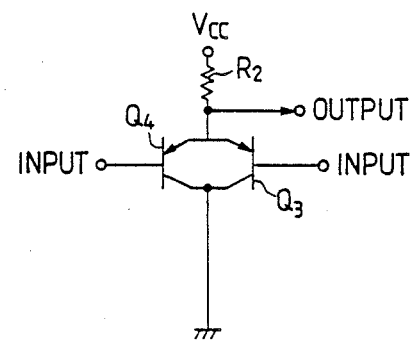
FIG. 3B is a lower-voltage detecting circuit used in the circuit for removing crosstalk components in a carrier chrominance signal.

The three-line type comb filter 27 includes first and second 1-H delay circuits 20 and 22, an inverter 21, first, second, and third higher-voltage detecting circuits (MAX circuits) 18, 19, and 25, first, second, and third lower-voltage detecting circuits (MIN circuits) 23, 24, and 17, and an adder 26. For example, the structure of these MAX circuits 18, 19, and 25 includes transistors Q1 and Q2 and a resistor R1 as shown in FIG. 3A, and each of the MIN circuits includes transistors Q3 and Q4 and a resistor R2 as shown in FIG. 3B.

The operation of the three-line type comb filter 27 will be described hereinbelow. Carrier chrominance signal (c) from first BPF 3 is fed to the first 1-H delay circuit 20, the first MAX circuit 18, and the first MIN circuit 23 in the three-line type comb filter 27. A delayed signal (n) outputted from the first 1-H delay circuit 20 is fed to the inverter 21 and the second 1-H delay circuit 22. An inverted signal (p) from the inverter 21 is sent to the first MAX circuit 18, the first MIN circuit 23, the second MAX circuit 19, and the second MIN circuit 24. In the first MAX circuit 18, a first higher voltage signal (s) between the carrier chrominance signal (c) and the inverted signal (p) is produced, and then the first higher voltage signal (s) is sent to the third MIN circuit 17. In the first MIN circuit 23, a first lower voltage signal (v) between the carrier chrominance signal (c) and the inverted signal (p) is produced, and then the first lower voltage signal (v) is sent to the third MAX circuit 25.

Meanwhile, a delayed signal (o) outputted from the second 1-H delay circuit 22 is also inputted into the second MAX circuit 19 and the second MIN circuit 24. In the second MAX circuit 19, a second higher voltage signal (t) between the inverted signal (p) and the delayed signal (o) is produced, and then the second higher voltage signal (t) is fed to the third MIN circuit 17. In the second MIN circuit 24, a second lower voltage signal (w) between the inverted signal (p) and the delayed signal (o) is produced, and then the second lower voltage signal (w) is fed to the third MAX circuit 25.

Furthermore, in the third MIN circuit 17, a third lower voltage signal (u) between the first higher voltage signal (s) and the second higher voltage signal (t) is produced, and then the third lower voltage signal (u) is supplied to the adder 26. In the third MAX circuit 17, a third higher voltage signal (x) between the first lower voltage signal (v) and the second lower voltage signal (w) is produced, and then the third higher voltage signal (x) is supplied to the adder 26. An added signal (r) from the adder 26 is fed to killer circuit 4.

Figure 4:
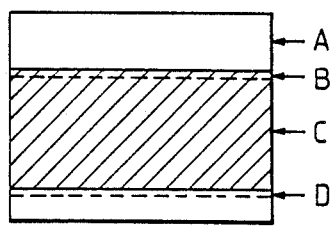
FIG. 4 is one example of source images which are to be inputted into the chrominance signal processing circuit of FIG. 1.

Now, the three-line comb filter 27 as a circuit for removing color-blurring and crosstalk component in a carrier chrominance signal will be described hereinbelow. It is assumed that a source image shown in FIG. 4 is applied in the three-line type comb filter 27. This image is formed of an upper colorless portion (A), a middle colored portion (C), and a lower colorless portion (E). A numeral (B) denotes the first line of the middle colored portion (C) and a numeral (D) shows the first line of the lower colorless portion (E).

Figure 5A:
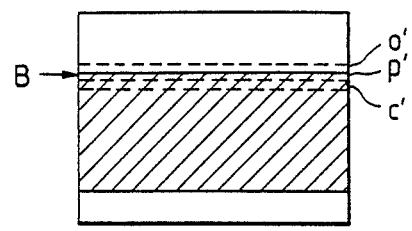
FIGS. 5A, 5B, and 5C are image patterns for describing the operation of the circuit for removing crosstalk components in a carrier chrominance signal.
Figure 5B:
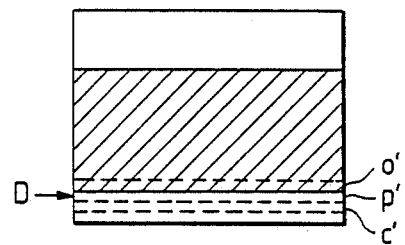
Figure 6A:
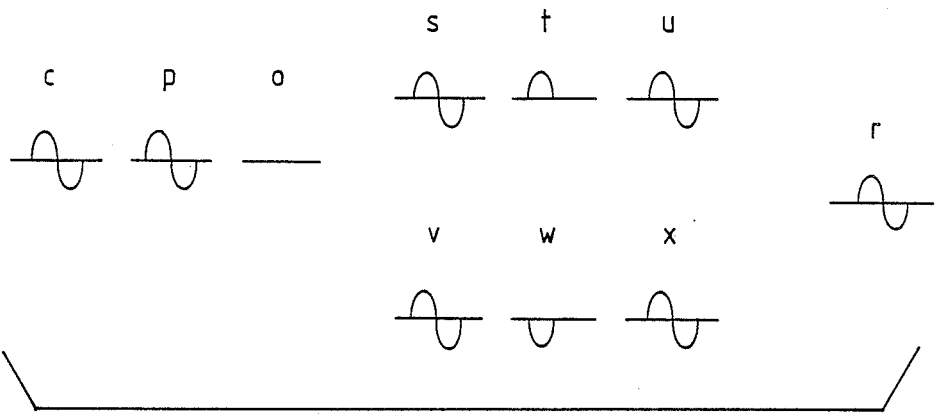
FIGS. 6A, 6B, 6C, 6D, and 6E are waveforms for describing the operation of the circuit for removing crosstalk components in a carrier chrominance signal.
Figure 6B:
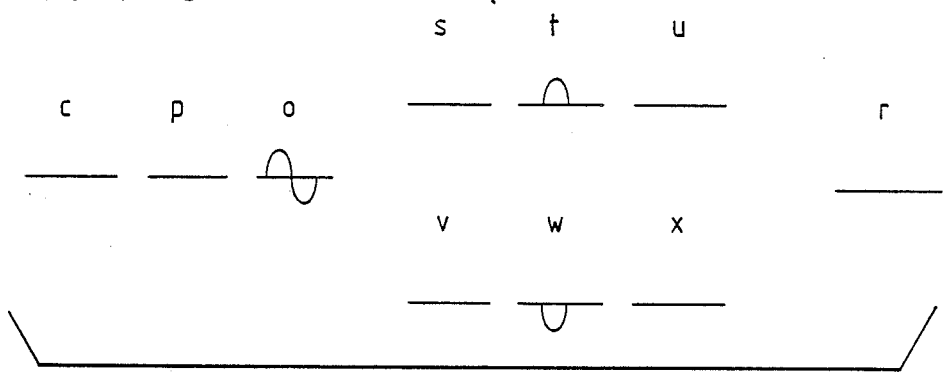
Figure 6C:
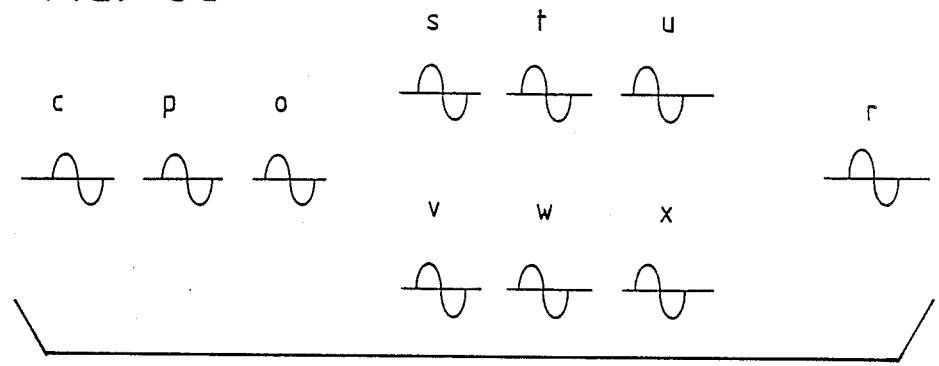

When a signal corresponding to the portion (B) is outputted from the 1-H delay circuit 20, signals (c'), (p'), and (o'), which are sequential on a display as horizontal lines, are displayed as shown in FIG. 5A. In this case, each waveform of the signals (c), (p), (o), (s), (t), (u), (v), (w), (x), and (r) without crosstalk are shown in FIG. 6A. When a signal corresponding to the portion (D) is outputted from the 1-H delay circuit 20, the signals (c'), (p'), and (o') are displayed as shown in FIG. 5B. In this case, each waveform of the signals (c), (p), (o), (s), (t), (u), (v), (w), (x), and (r) are shown in FIG. 6B. Thus, in the signal (r), it can be understood that any chrominance signal is not outputted. When these sequential signals (c'), (p'), and (o') have the same color, since these three signals have vertical-correlation, all the signals (c), (p), (o), (s), (t), (u), (v), (w), (x), and (r) become equal as shown in FIG. 6C. When all sequential three signals (c'), (p'), and (o') have no color, since these three signals have also vertical-correlation, the signal (r) is also of colorlessness.

Figure 5C:
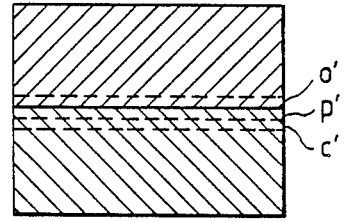
Figure 6D:
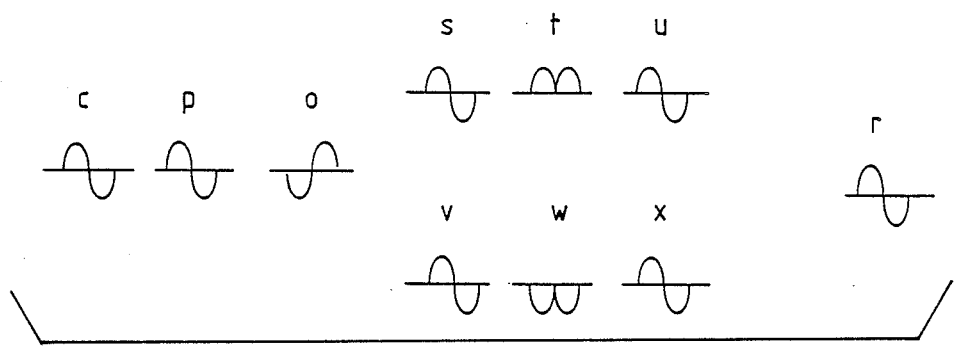

Besides, when a hue is reversed between magenta and green as shown in FIG. 5C, i.e. when the signal (o') is magenta and both the signals (p') and (c') are green, each waveform of the signals (c), (p), (o), (s), (t), (u), (v), (w), (x), and (r) is shown in FIG. 6D. It is to be noted that magenta and green can be completely distinguished.

Figure 6E:
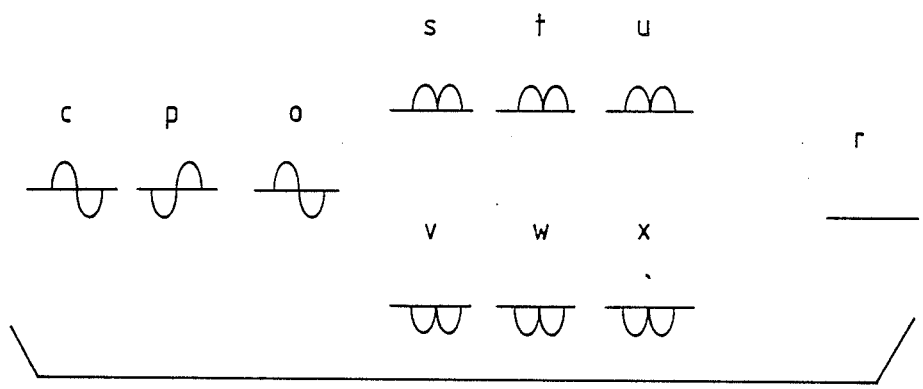

In the case of the crosstalk components, since the crosstalk signal has the same phase in every other horizontal line, each waveform of the signals (c), (p), (o), (s), (t), (u), (v), (w), (x), and (r) are shown in FIG. 6E. Thus, in the signal (r), it can be understood that such crosstalk components are substantially removed.

As will be understood from the above description, in the three-line type comb filter 27, the signal (r) is outputted therefrom as an average signal between the signal (p) and one closer signal to the signal (p) in the signals (c) and (o), whereby the signal (p) is the main signal therebetween. Moreover, the signal (p) shows a 1-H delayed signal. Here, if the 1-H delayed signal (p) per se is used in a phase control circuit as the following step, 1-H time duration occurs in the operation of a phase correction. Therefore, the adder 28 is required for removing the 1-H time duration as one part of a two-line type comb filter. The adder 28, the inverter 21, and the 1-H delay circuit 20 form the two-line type comb filter for correcting such a time delay due to the three-line type comb filter 27. In the adder 28, the signal (c) is added to the signal (p) to produce a signal (q), and the signal (q) is sent to the burst gate 6.

Figure 2:
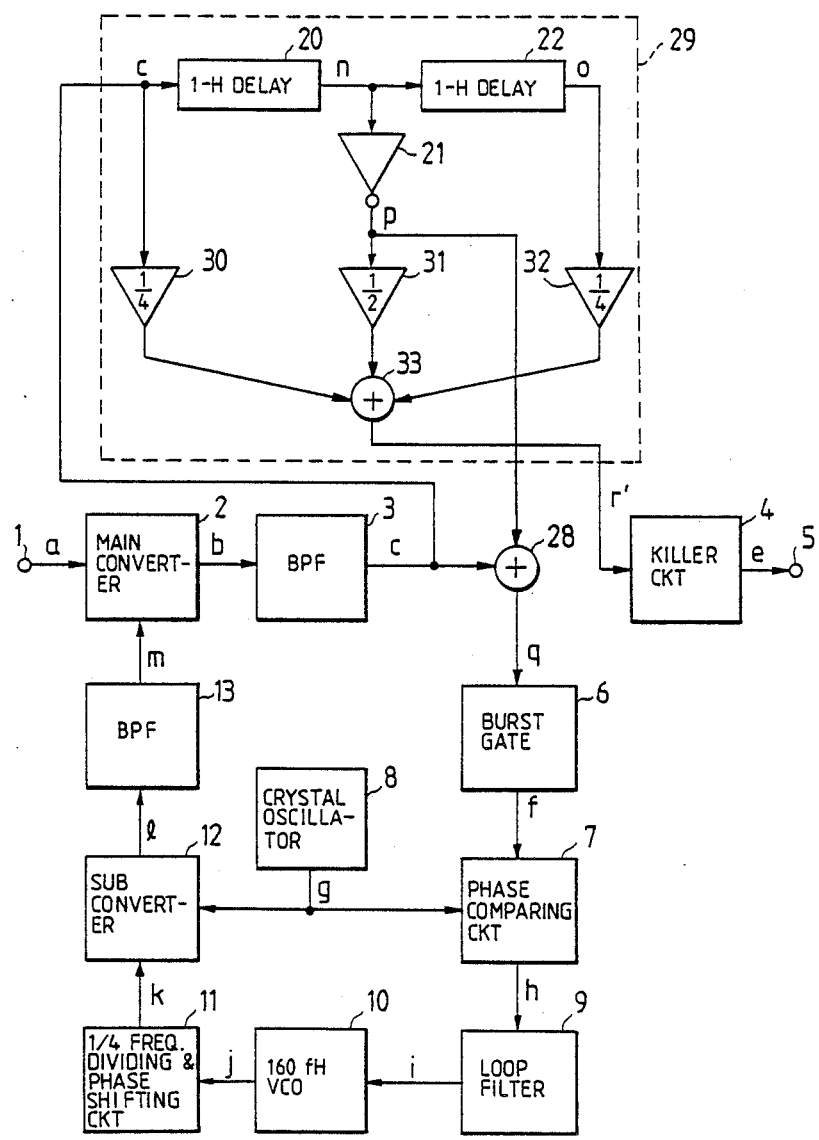
FIG. 2 is a block diagram of a chrominance signal processing circuit having a circuit for removing crosstalk components in a carrier chrominance signal according to a second embodiment of the invention.

FIG. 2 shows a block diagram of a chrominance signal processing circuit having a circuit for removing crosstalk components in the NTSC system according to a second embodiment of the present invention. The chrominance signal processing circuit of FIG. 2 is substantially the same as that of FIG. 1 except for a chrominance signal comb filter 29. In this diagram, those parts which are the same as those of FIG. 7 are designated at the same numerals and description thereof is omitted.

The three-line type comb filter 29 includes first and second 1-H delay circuits 20 and 22, an inverter 21, first and second $\frac{1}{4}$ attenuation circuits 30 and 32, a $\frac{1}{2}$ attenuation circuit 31, and an adder 33.

The operation of the three-line type comb filter 29 will be described hereinbelow. Carrier chrominance signal (c) from first BPF 3 is fed to the first 1-H delay circuit 20 and the first $\frac{1}{4}$ attenuation circuit 30. An output signal (n) from the first 1-H delay circuit 20 is sent to the second 1-H delay circuit 22 and the inverter 21. Then, an output signal (o) from the second 1-H delay circuit 22 is supplied to the second $\frac{1}{4}$ attenuation circuit 32, and an output signal (p) from the inverter 21 is inputted into the $\frac{1}{2}$ attenuation circuit 31. Finally, output signals from the first and second $\frac{1}{4}$ attenuation circuits 30 and 32 and the $\frac{1}{2}$ attenuation circuit 31 are combined in the adder 33, and then the added signal (r') is sent to the killer circuit 4.

When a signal corresponding to the portion (B) of FIG. 5A is outputted from the 1-H delay circuit 20, a color component is added to the colorless signal (o') by $\frac{1}{4}$, and the signal (p') is produced as a colored signal in which $\frac{1}{4}$ of the colored signal is subtracted. When a signal corresponding to the portion (D) of FIG. 5B is outputted from the 1-H delay circuit 20, the signal (o') is produced as a colored signal in which $\frac{1}{4}$ of the colored signal is subtracted, and a color component is added to the colorless signal (p') by $\frac{1}{4}$. Also in the crosstalk removing circuit of the second embodiment, thus, there is such a great color-blurring removing effect.

Although the block diagrams of FIGS. 1 and 2 are of the NTSC system, when the above-mentioned present embodiments are applied to that of the PAL system, the following changes are required. The 160fH VCO 10 is changed into a 321fH VCO, and the $\frac{1}{4}$ frequency-dividing and phase-shifting circuit 11 is changed into a $\frac{1}{8}$ frequency-dividing and phase-shifting circuit. Besides, the first and second 1-H delay circuits 20 and 22 are respectively changed into 2-H delay circuits. Then, in the main converter 2, the chrominance signal is converted into a signal having a frequency of 4.43MHz, and the crystal oscillator produces a signal having a frequency of 4.43MHz thereby obtaining a 5.06MHz signal from the second BPF 13.

The above-described embodiments are just examples of the present invention, and therefore, it will be apparent for those skilled in the art that many modifications and variations may be made without departing from the scope of the present invention.

What is claimed is:

1. A circuit for removing crosstalk components in a carrier chrominance signal, comprising:
   (a) first delay circuit means responsive to said carrier chrominance signal;
   (b) inverter means responsive to an output signal from said first delay circuit means;
   (c) first higher-voltage detecting circuit means responsive to said carrier chrominance signal and an output signal from said inverter means for outputting a first highervoltage signal therebetween;
   (d) second delay circuit means responsive to said output signal from said first delay circuit means;
   (e) second higher-voltage detecting circuit means responsive to said output signal from said inverter means and an output signal from said second delay circuit means for outputting a second higher-voltage signal therebetween;

(f) first lower-voltage detecting circuit means responsive to said first and second higher-voltage signals for outputting a first lower-voltage signal;

(g) second lower-voltage detecting circuit means responsive to said carrier chrominance signal and said output signal from said inverter means for outputting a second lower-voltage signal therebetween;

(h) third lower-voltage detecting circuit means responsive to said output signal from said inverter means and said output signal from said second delay circuit means for outputting a third lower-voltage signal therebetween;

(i) third higher-voltage detecting circuit means responsive to said first and second lower-voltage signals for outputting a third higher-voltage signal;

(j) first adder means responsive to said third higher-voltage signal and said first lower-voltage signal thereby producing a crosstalk-removed carrier chrominance signal; and (k) a second adder means responsive to said carrier chrominance signal and to said output signal from said inverter means, said first delay circuit means, said inverter means and said second adder means comprising a comb filter for correcting a time delay due to said circuit for removing crosstalk components.

2. A circuit for removing crosstalk components in a carrier chrominance signal as claimed in claim 1, wherein said first and second delay circuit means are 1-H delay circuit in NTSC system.

3. A circuit for removing crosstalk components in a carrier chrominance signal as claimed in claim 1, wherein said first and second delay circuit means are 2-H delay circuit in PAL system.

* * * * *

UNITED STATES PATENT AND TRADEMARK OFFICE
CERTIFICATE OF CORRECTION

PATENT NO. : 4,969,033

DATED : November 6, 1990

INVENTOR(S) : Hiroshi Yamada, et al.

It is certified that error appears in the above-identified patent and that said Letters Patent is hereby corrected as shown below:

On the title page, in item [30] "Foreign Application Priority Data" change "62-120576" to --62-320872-- and change "63-320872" to --63-120576--.

Signed and Sealed this

Fourteenth Day of July, 1992

Attest:

DOUGLAS B. COMER

*Attesting Officer*      *Acting Commissioner of Patents and Trademarks*